No. 681,475. Patented Aug. 27, 1901.
G. W. DOLLINGER.
NUT LOCK.
(Application filed Nov. 30, 1900.)

(No Model.) 2 Sheets—Sheet 1.

Witnesses

Inventor
George W. Dollinger
by his Attorney

THE NORRIS PETERS CO., PHOTO-LITHO., WASHINGTON, D. C.

No. 681,475. Patented Aug. 27, 1901.
G. W. DOLLINGER.
NUT LOCK.
(Application filed Nov. 30, 1900.)
(No Model.) 2 Sheets—Sheet 2.
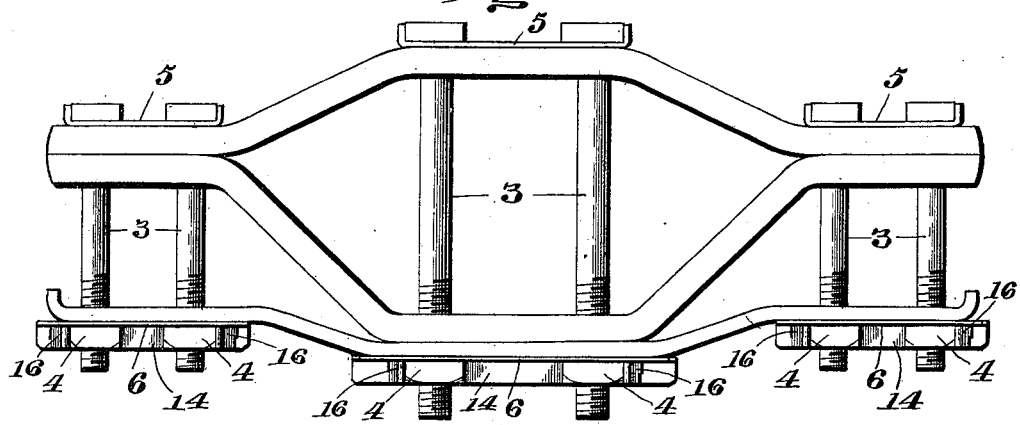
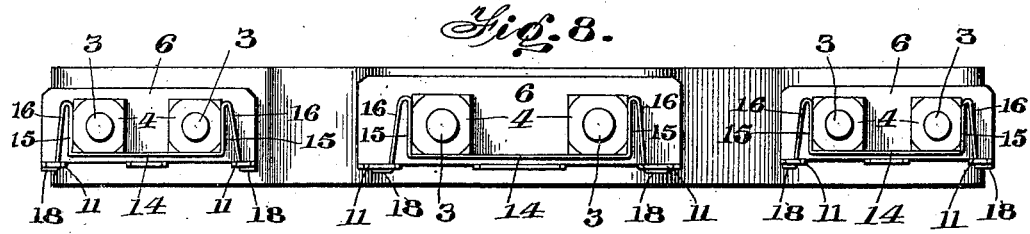
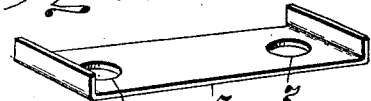
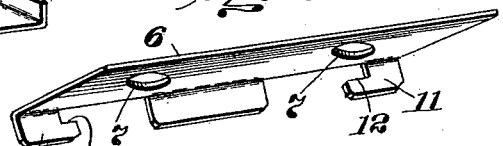
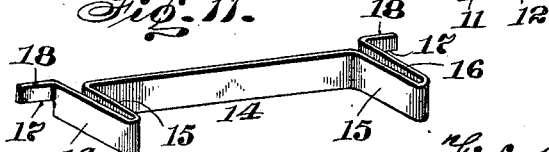
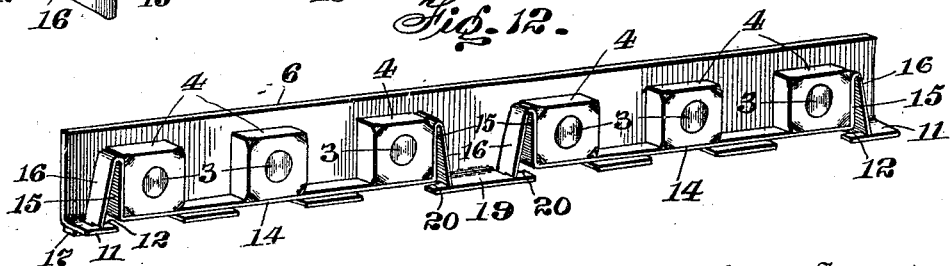
Witnesses
Marcus L. Byng.
Chas. L. Wallace
Inventor
George F. Dollinger
by
Attorney

UNITED STATES PATENT OFFICE.

GEORGE W. DOLLINGER, OF ALTOONA, PENNSYLVANIA, ASSIGNOR OF ONE-HALF TO M. P. BRUMBAUGH, OF SAME PLACE.

NUT-LOCK.

SPECIFICATION forming part of Letters Patent No. 681,475, dated August 27, 1901

Application filed November 30, 1900. Serial No. 38,222. (No model.)

*To all whom it may concern:*

Be it known that I, GEORGE W. DOLLINGER, a citizen of the United States, residing at Altoona, in the county of Blair and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to improvements in nut-locks; and it has for one object to provide a lock of this character by the employment of which nuts are positively retained on their bolts, thereby obviating accidents arising from the displacement of the nuts from the bolts, due to loosening from vibration and other causes.

A further object of the invention is the provision of a nut-lock which may be used continuously, thus enabling the same to be employed with different bolts and under varying conditions, and thereby eliminating the expense arising from the necessity of using entirely new locks when a subsequent equipment of the bolts with the same is desired.

With these and other objects in view, which will appear as the nature of the improvements is better understood, the invention consists, substantially, in the novel construction, combination, and arrangement of parts, as will be hereinafter fully described, illustrated in the accompanying drawings, and pointed out in the appended claims.

Figure 1:
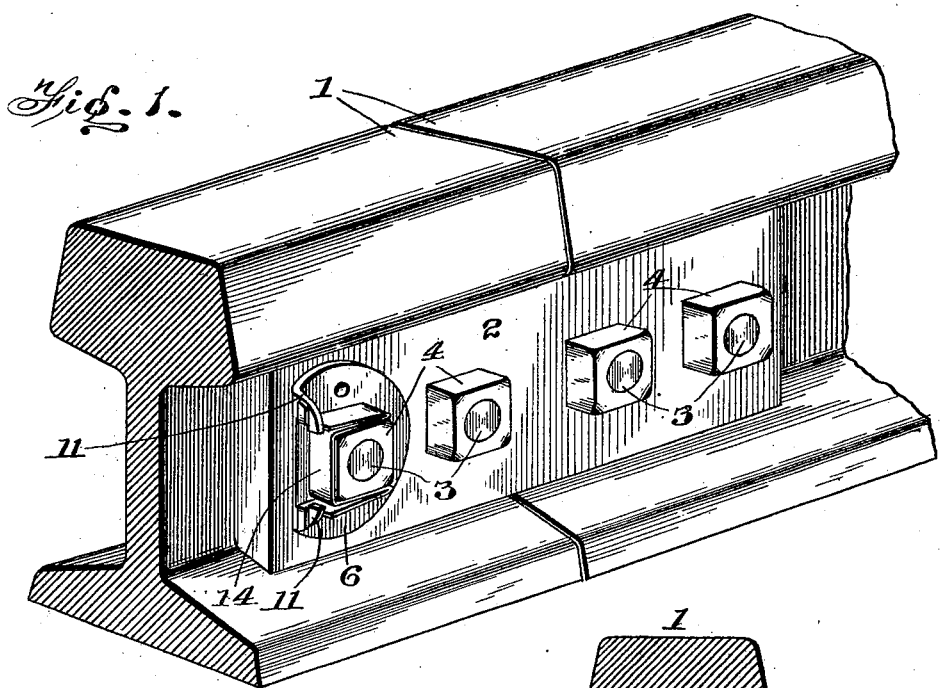
Figure 2:
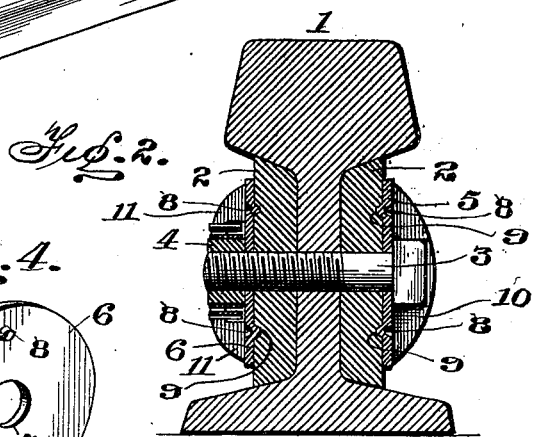
Figures 3, 4:
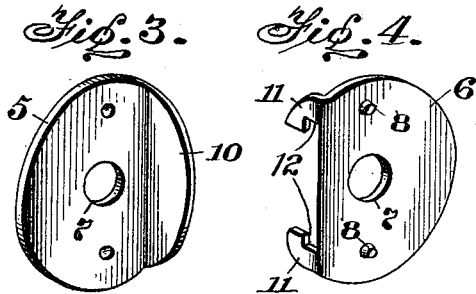
Figure 5:
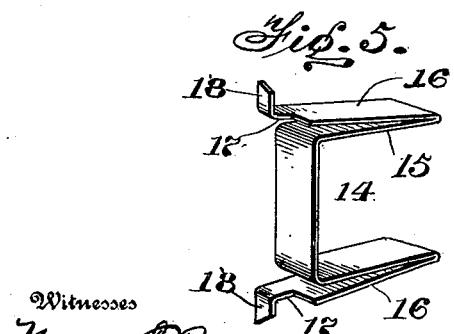
Figure 6:
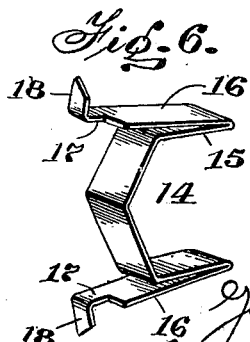

In the drawings, Figure 1 is a perspective view of a railroad-rail equipped with a nut-lock constructed in accordance with the present invention. Fig. 2 is a vertical transverse sectional view thereof, taken through one of the bolts. Fig. 3 is a detail perspective view of the bolt-washer. Fig. 4 is a similar view of the nut-washer. Fig. 5 is an enlarged detail perspective view of the nut-fastener. Fig. 6 is a similar view of another form of fastener. Fig. 7 is a side elevation of the bolster of a car-truck equipped with another form of the lock. Fig. 8 is a bottom plan view thereof. Figs. 9 and 10 are detail perspective views of the bolt and nut washers. Fig. 11 is a similar view of the nut-fastener. Fig. 12 is also a perspective view of a further form of the lock.

Referring to the drawings, the numeral 1 designates the meeting ends of a pair of alined railroad-rails; 2, the fish-plates arranged at the sides thereof; 3, the securing-bolts for connecting the webs of the rails and the fish-plates, and 4 the nuts carried by the bolts.

It will be noted that only one bolt is provided with the herein-described nut-lock, this being deemed sufficient for purposes of illustration, and referring in detail to the construction of the lock the same comprises a bolt-washer 5 and a nut-washer 6, arranged at opposite sides of the rails and each provided with an opening 7, through which the bolt 3 passes. It will also be noted that each of the washers 5 and 6 is provided with a series of projections 8, which projections are preferably formed by punching, and said projections are adapted to fit within recesses 9, formed in the outer faces of the fish-plates 2. It will thus be seen that through the medium of the projections 8 and the recesses 9 the washers 5 and 6 are held in such relation to the fish-plates as to be incapable of rotation on the bolt 3.

The washer 5 is provided with an upturned flange 10, against which flange the head of the bolt 3 is adapted to rest, and thus said bolt is prevented from rotating; and it will also be observed that the washer 6 is likewise provided with upturned locking-lugs 11, having at their opposite edges and adjacent to the body of said washer 6 notches 12, for a purpose to be presently stated; but said locking-lugs 11 are spaced sufficiently apart as to prevent contact of the nut 4 during its rotation when being screwed or unscrewed from the bolt.

In order to prevent rotation of the nut 4 upon the bolt, a spring-fastener 14 is employed, and said fastener is formed of a single strip of metal, so bent at its center as to form a body portion 15, adapted to embrace the nut. As shown in Figs. 1 to 5, said body portion is square, so that the same may be applied to square nuts; but in Fig. 6 the body portion 15 is of such shape as to be capable of use with hexagonal nuts. The ends of the strip of which the fastener is formed are bent back upon the body portion 15, so as to form resilient arms 16, the extremities of which are reduced to form a neck 17, which terminates in an engaging clip 18, the latter being bent at right angles to the neck 17. The clips 18 extend in opposite directions and are each adapted to lie against the outer side of one of the locking-lugs 11, and the necks 17, through the resiliency of the arms 16, are forced into the notches 12, thereby preventing the fastener being displaced from the nut either through sliding movement or by being swung outwardly from the nut-washer.

The operation of the herein-described fastener is as follows: The bolts 3, with the fish-plates 2 thereof, and also the washers 5 and 6, are assembled, as shown in Figs. 1 and 2, after which the nuts 4 are screwed upon the bolts 3 to the desired extent. When this has been accomplished, one of the fasteners 14 is slid between the locking-lugs 11, so that the body portion 15 thereof will embrace the nut 4, and as soon as the necks 17 have arrived opposite the notches 12 the resiliency of the arms 16 causes said necks to become seated in the notches 12. In this position the clips 18 abut against the lugs 11 and the fastener 14 is securely held upon the nut. The latter is thus incapable of rotating upon the bolt. If, however, it is desired to remove the nut from the bolt, the same may be accomplished by simply pressing upon the arms 16, so that the same will move toward each other, whereupon the necks 17 are withdrawn from the notches 12, and when this has been effected the fastener 14 may be readily slid from the nut and the latter rendered capable of being removed.

As previously stated, the body 15 of the fastener 14 may be hexagonal, as shown in Fig. 6, or in any other form necessary to fit the contour of the nuts employed.

In Figs. 7 to 11, inclusive, is shown another form of the invention designed especially for use upon bolts employed in connection with car-trucks. It will be noted, however, that the mechanical elements are precisely the same, excepting that the bolt and nut washers 5 and 6 are in the form of elongated plates, and the fastener 14 in lieu of being adapted for application to a single nut is elongated, so as to readily engage a series of nuts. The nut-washer 6 is also provided with a flange 19, against which the body 14 of the fastener is designed to rest, said flange being in alinement with the lugs 11.

Fig. 12 illustrates a further form of the invention, and in this form the nut-washer is elongated to such an extent as to be capable of application to a series of bolts, the central flange 19 being notched at its ends, as at 20, and with said washer a pair of fasteners is employed in lieu of a single fastener, said fasteners engaging with the locking-lugs at the ends of the washer and with the notched flange at the center.

While the forms of the invention herein shown and described are what are believed to be preferable embodiments of the invention, the right is reserved to modify or vary the invention as falls within the spirit and scope thereof. The use of the invention is also not restricted to railroad-rails and car-trucks; but the same may be employed in connection with various lines of machinery.

Having thus described the invention, what is claimed as new, and desired to be secured by Letters Patent, is—

1. In a nut-lock, the combination with a bolt and its nut, of a washer mounted upon said bolt and provided with locking-lugs, and a fastener adapted to embrace said nut, said fastener being formed of a single strip having its central portion bent to form a body and its ends bent back upon said body to form resilient arms adapted to engage the locking-lugs for retaining the fastener upon the nut.

2. In a nut-lock, the combination with a bolt and its nut, of a washer mounted upon said bolt and provided with means for rendering the washer incapable of rotation, said washer being also provided with locking-lugs having notches, and a fastener adapted to embrace said nut, said fastener being formed of a single strip having its central portion bent to form a body and its ends bent back upon said body to form resilient arms, said arms terminating in necks adapted to fit within the notches of the locking-lugs, whereby the fastener is retained upon the nut.

3. In a nut-lock, the combination with a bolt and its nut, of a washer mounted thereon and provided with an upturned flange against which the head of the bolt is adapted to rest, a nut-washer also mounted on said bolt and provided with locking-lugs having notches, said washers being each provided with means for rendering the same incapable of rotation, and a fastener adapted to embrace said nut and comprising a body portion, resilient arms bent back upon said body portion and terminating in necks, and engaging clips carried by said necks, said necks being adapted to fit within the notches of the locking-lugs, whereby the fastener is retained upon the nut.

In testimony whereof I affix my signature in the presence of two witnesses.

GEO. W. DOLLINGER.

Witnesses:
CHARLES H. BEHE,
J. W. RUPERT.